(12) United States Patent
Christensen

(10) Patent No.: US 7,151,379 B2
(45) Date of Patent: Dec. 19, 2006

(54) TECHNIQUES TO TEST TRANSMITTED SIGNAL INTEGRITY

(75) Inventor: Steen Bak Christensen, Roskilde (DK)

(73) Assignee: Intel Corporation, Santa Clara, CA (US)

(*) Notice: Subject to any disclaimer, the term of this patent is extended or adjusted under 35 U.S.C. 154(b) by 160 days.

(21) Appl. No.: 10/659,216

(22) Filed: Sep. 9, 2003

(65) Prior Publication Data

US 2005/0052189 A1 Mar. 10, 2005

(51) Int. Cl.
G01R 23/20 (2006.01)
H04B 3/46 (2006.01)
H04L 25/40 (2006.01)

(52) U.S. Cl. ............... 324/620; 375/226; 375/371; 702/69

(58) Field of Classification Search ........ 324/620–626; 375/354–376, 226, 224–225, 295–315; 702/69
See application file for complete search history.

(56) References Cited

U.S. PATENT DOCUMENTS

| | | | |
|---|---|---|---|
| 5,630,113 A * | 5/1997 | Hayssen et al. | 713/503 |
| 5,657,359 A | 8/1997 | Sakae et al. | |
| 5,815,298 A * | 9/1998 | Cern | 398/16 |
| 5,977,806 A | 11/1999 | Kikuchi | |
| 6,009,134 A | 12/1999 | Yoon | |
| 6,449,576 B1 * | 9/2002 | Bass et al. | 702/117 |
| 6,535,567 B1 * | 3/2003 | Girardeau, Jr. | 375/372 |
| 6,539,051 B1 * | 3/2003 | Grivna | 375/219 |
| 6,823,001 B1 * | 11/2004 | Chea | 375/219 |
| 6,823,483 B1 * | 11/2004 | Creigh | 714/701 |
| 2002/0114416 A1 | 8/2002 | Enam et al. | |
| 2002/0159130 A1 | 10/2002 | Sakano et al. | |
| 2003/0185325 A1 * | 10/2003 | Wahl | 375/362 |
| 2004/0100335 A1 * | 5/2004 | Abidin et al. | 331/57 |
| 2004/0120406 A1 * | 6/2004 | Searles et al. | 375/259 |
| 2004/0228636 A1 | 11/2004 | Pathak et al. | |

FOREIGN PATENT DOCUMENTS

EP   1 283 615 A2   2/2003

OTHER PUBLICATIONS

Christensen, Steen B. et al., U.S. Appl. No. 10/205,728, entitled "Techniques to Regenerate a Signal", filed Jul. 25, 2002, 18 pages including figures.
European Patent Office, International Search Report for International Patent Application No. PCT/US2004/027730, 8 pages, Dec. 13, 2004.
European Patent Office, Written Opinion for International Patent Application No. PCT/US2004/027730, 5 pages, Dec. 13, 2004.
IEEE Std 802.3, Part 3: Carrier sense multiple access with collision detection (CSMA/CD) access method and physical layer specifications, 1998 Edition, pp. 1 & 42.
U.S. Patent & Trademark Office, Non-Final Office Action for U.S. Appl. No. 10/205,728, Oct. 18, 2005, 18 pages.

* cited by examiner

*Primary Examiner*—Anjan Deb
*Assistant Examiner*—Jeff Natalini
(74) *Attorney, Agent, or Firm*—Glen B. Choi

(57) ABSTRACT

Briefly, a system that may facilitate system and line loop back diagnostic operations. In one possible implementation, a first transceiver may transmit test signals to a second transceiver. The second transceiver may include a transmitter with the capability to reduce jitter in received test signals prior to transmission of received test signals back to the first transceiver. The first transceiver may determine path integrity characteristics based on the test signals transmitted from the second transceiver.

25 Claims, 6 Drawing Sheets

TECHNIQUES TO TEST TRANSMITTED SIGNAL INTEGRITY

FIELD

The subject matter disclosed herein generally relates to techniques to test transmitted signal integrity.

DESCRIPTION OF RELATED ART

Jitter is the general term used to describe distortion caused by variation of a signal from its reference timing position in a communications system. In an ideal system, bits arrive at time increments that are integer multiples of a bit repetition time. In an operational system, however, pulses typically arrive at times that deviate from these integer multiples. This deviation may cause errors in the recovery of data, particularly when data is transmitted at high speeds. The deviation or variation may be in the amplitude, time, frequency or phase of this data. Jitter may be caused by a number of phenomena, including inter-symbol interference, frequency differences between the transmitter and receiver clock, noise, and the non-ideal behavior of the receiver and transmitter clock generation circuits.

Jitter is a problem of particular import in digital communications systems for several reasons. First, jitter causes the received signal to be sampled at a non-optimal sampling point. This occurrence reduces the signal-to-noise ratio at the receiver and thus limits the information rate. Second, in practical systems, each receiver must extract its received sampling clock from the incoming data signal. Jitter makes this task significantly more difficult. Third, in long distance transmission systems, where multiple repeaters reside in the link, jitter accumulates.

BRIEF DESCRIPTION OF THE DRAWINGS

The subject matter regarded as the invention is particularly pointed out and distinctly claimed in the concluding portion of the specification. The invention, however, both as to organization and method of operation may best be understood by reference to the following detailed description when read with the accompanying drawings in which:

Note that use of the same reference numbers in different figures indicates the same or like elements.

DETAILED DESCRIPTION

Figure 1A:
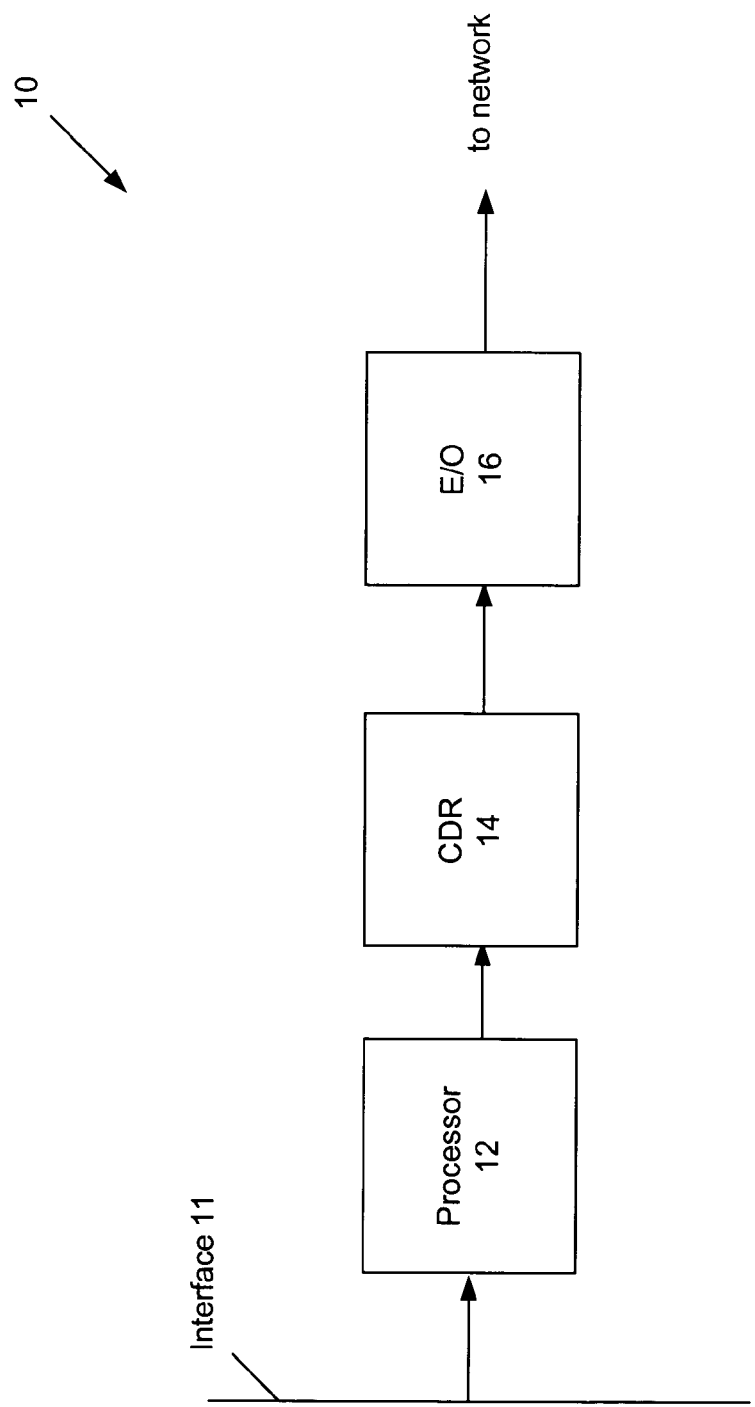
FIGS. 1A to 1D depict systems that can utilize embodiments of the present invention.

FIG. 1A depicts an implementation of a transmitter system 10 that can use embodiments of the present invention. System 10 may include an interface 11, processor 12, clock and data recovery device (CDR) 14, and electrical-to-optical signal converter (E/O) 16.

Interface 11 may provide intercommunication between processor 12 and other devices such as a memory device (not depicted), packet processor (not depicted), microprocessor (not depicted), and/or a switch fabric (not depicted). Interface 11 may comply with one or more of the following standards: Ten Gigabit Attachment Unit Interface (XAUI) (described in IEEE 802.3, IEEE 802.3ae, and related standards), Serial Peripheral Interface (SPI), I²C, universal serial bus (USB), IEEE 1394, Gigabit Media Independent Interface (GMII) (described in IEEE 802.3, IEEE 802.3ae, and related standards), Peripheral Component Interconnect (PCI), ten bit interface (TBI), and/or a vendor specific multi-source agreement (MSA) protocol.

Processor 12 may perform media access control (MAC) encoding in compliance for example with Ethernet (as described for example in IEEE 802.3 and related standards); framing and wrapping in compliance for example with ITU-T G.709; and/or forward error correction (FEC) encoding in compliance for example with ITU-T G.975. CDR 14 may remove jitter from signals provided by processor 12. For example, CDR 14 may utilize some embodiments of the present invention. E/O 16 may convert electrical signals into stable optical signals for transmission to an optical network. In some implementations, E/O 16 is not used and an electrical signal is transmitted to a network (e.g., gigabit Ethernet over copper).

In one implementation, components of transmitter system 10 may be implemented among the same integrated circuit. In another implementation, components of transmitter system 10 may be implemented among several integrated circuits that intercommunicate using, for example, a bus or conductive leads of a printed circuit board.

Figure 1B:
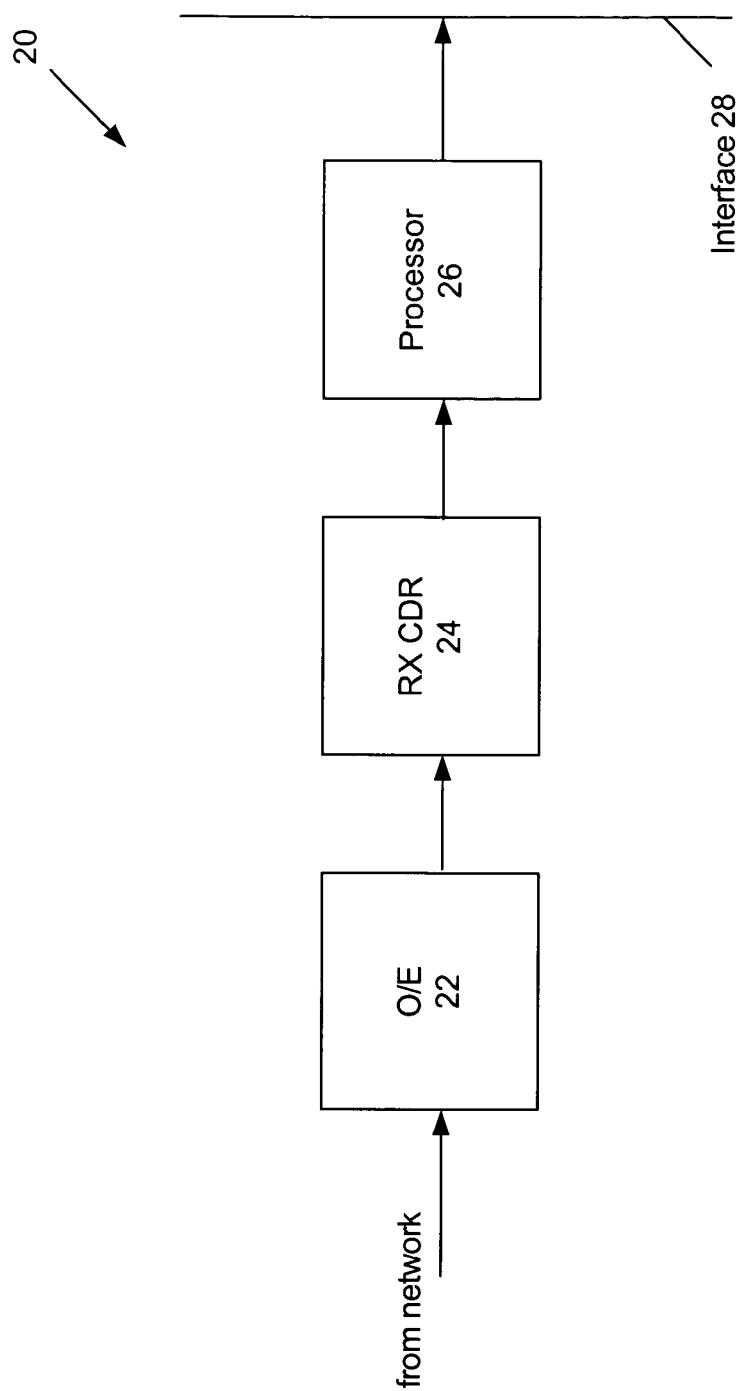

FIG. 1B depicts an implementation of a receiver system 20 that can use embodiments of the present invention. System 20 may include an optical-to-electrical signal converter (O/E) 22, receiver (RX) CDR 24, processor 26, and interface 28. O/E 22 may convert optical signals from an optical network to stable electrical signals. In some implementations, O/E 22 is not used and an electrical signal is received from a network (e.g., gigabit Ethernet over copper). RX CDR 24 may remove jitter from received signals and provide electrical format signals. RX CDR 24 may use some embodiments of the present invention. Processor 26 may perform media access control (MAC) processing in compliance for example with Ethernet; optical transport network (OTN) de-framing and de-wrapping in compliance for example with ITU-T G.709; and/or forward error correction (FEC) processing in compliance for example with ITU-T G.975. Interface 28 may provide intercommunication between processor 26 and other devices such as a memory device (not depicted), packet processor (not depicted), microprocessor (not depicted) and/or a switch fabric (not depicted). Interface 28 may utilize similar communications techniques as those of interface 11.

In one implementation, components of receiver system 20 may be implemented among the same integrated circuit. In another implementation, components of receiver system 20 may be implemented among several integrated circuits that intercommunicate using, for example, a bus or conductive leads of a printed circuit board.

Figure 1C:
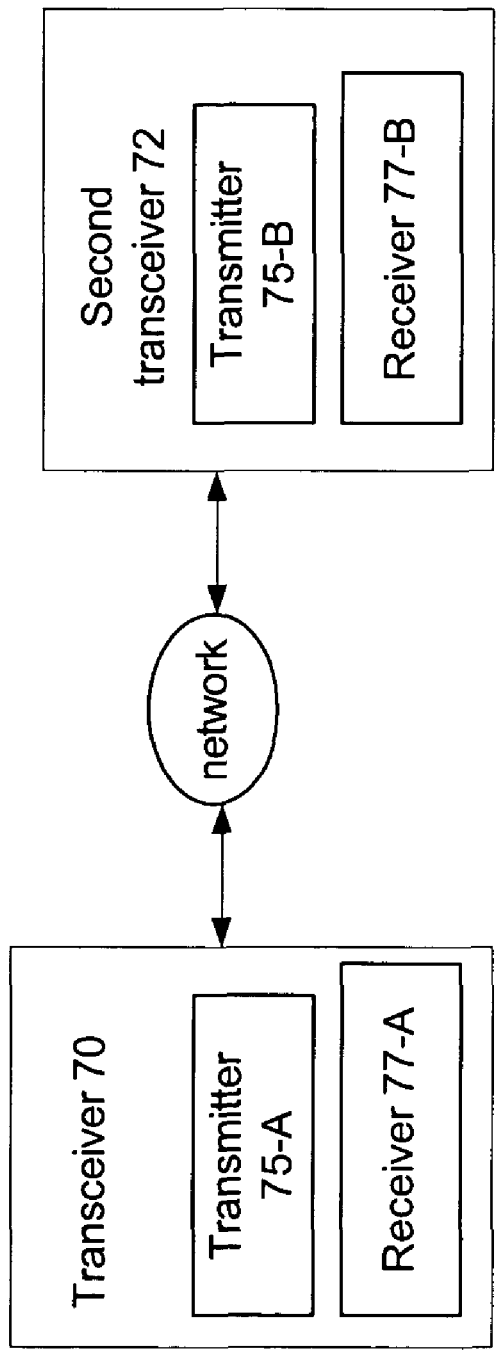

FIG. 1C depicts a system that can use some embodiments of the present invention. The configuration of FIG. 1C may be used in "line loop back mode." Transceiver 70 and second transceiver 72 may exchange signals using a network.

For example, transceiver 70 may utilize a transmitter system 75-A (transmitter system 75-A may utilize transmitter system 10) to transmit a test signal to second transceiver 72. Second transceiver 72 may receive the signal using receiver 77-B (receiver 77-B may utilize receiver system 20) and then transfer the received signal back to transceiver 70 using transmitter 75-B (transmitter system 75-B may be similar to transmitter system 75-A). Receiver 77-A (receiver 77-A may be similar to receiver 77-B) of transceiver 70 may receive the transferred signal from transmitter 75-B. For example, a processor used by receiver 77-A may receive the test signal or be programmed with the test signal used during line loop back mode so that the processor can determine whether component testing and/or network path testing pass.

Figure 1D:
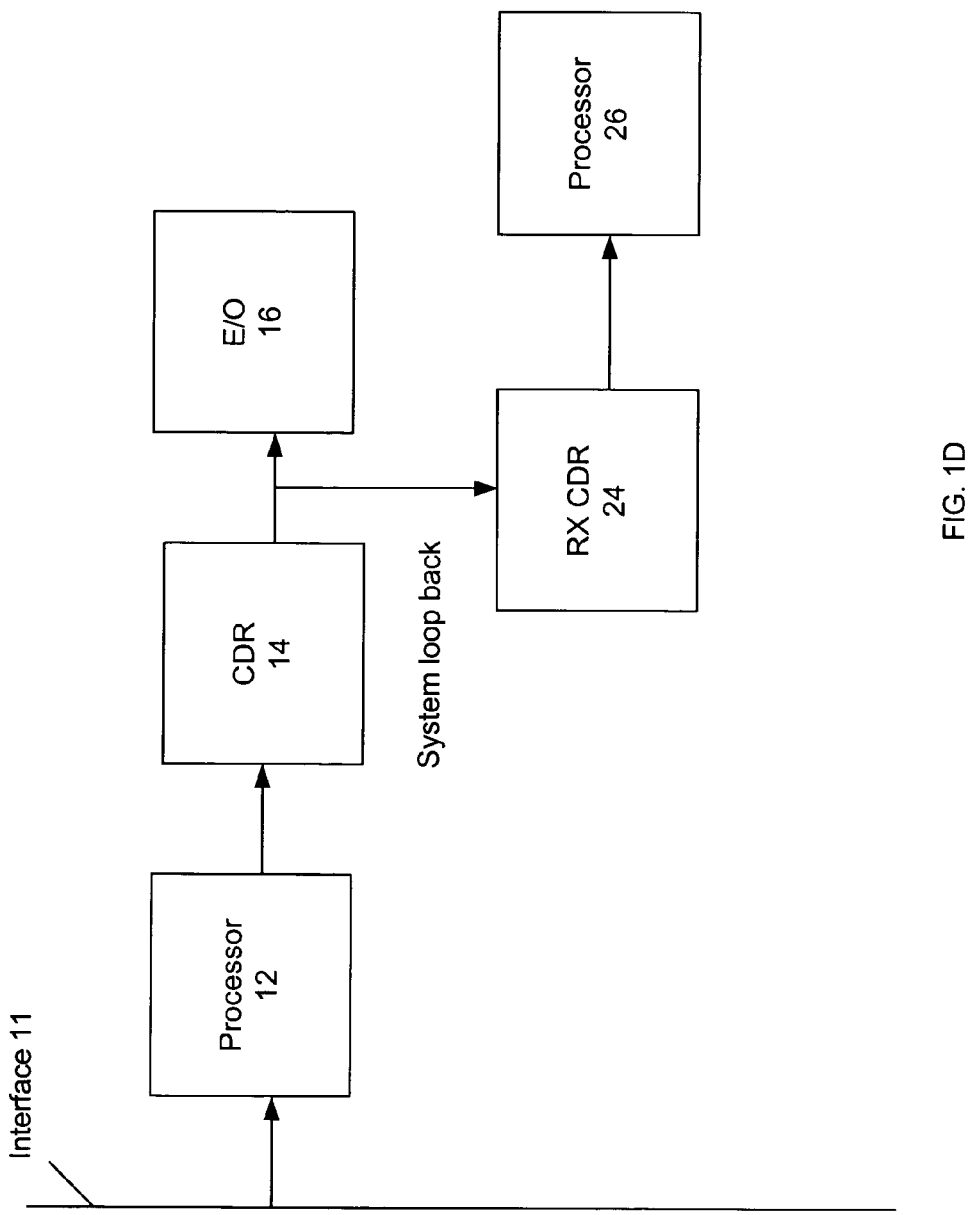

FIG. 1D depicts a system in accordance with an embodiment of the present invention. The configuration of FIG. 1D can be used during system loop back mode (i.e., the test signal is not transmitted through a network (such as the Internet) but through a local communications path directly to a receiver portion of a transceiver or to a local receiver). For example, the configuration of FIG. 1D may include components from both transmitter system 10 and receiver 20 implemented in the same transceiver device. Instead of transmitting a signal to a network, this embodiment may loop back a transmitted signal from transmitter system 10 directly to receiver 20. In this example, processor 26 may receive or be programmed with the signal used during loop back so that processor 26 can determine whether component testing and/or network path testing pass.

Some prior art transceivers provide loop-back capabilities. In one prior art implementation of "line loop back", jitter clean-up of re-transmitted signals is not provided. Such implementation has the disadvantage that the jitter transmitted back has excessive jitter resulting in poor performance and possibility for erroneous conclusions. Another prior art implementation of "line loop back" uses a bus of multiple data lines to loop back a signal. Such implementation requires excessive board space, which is difficult to implement in very small modules.

Figure 2:
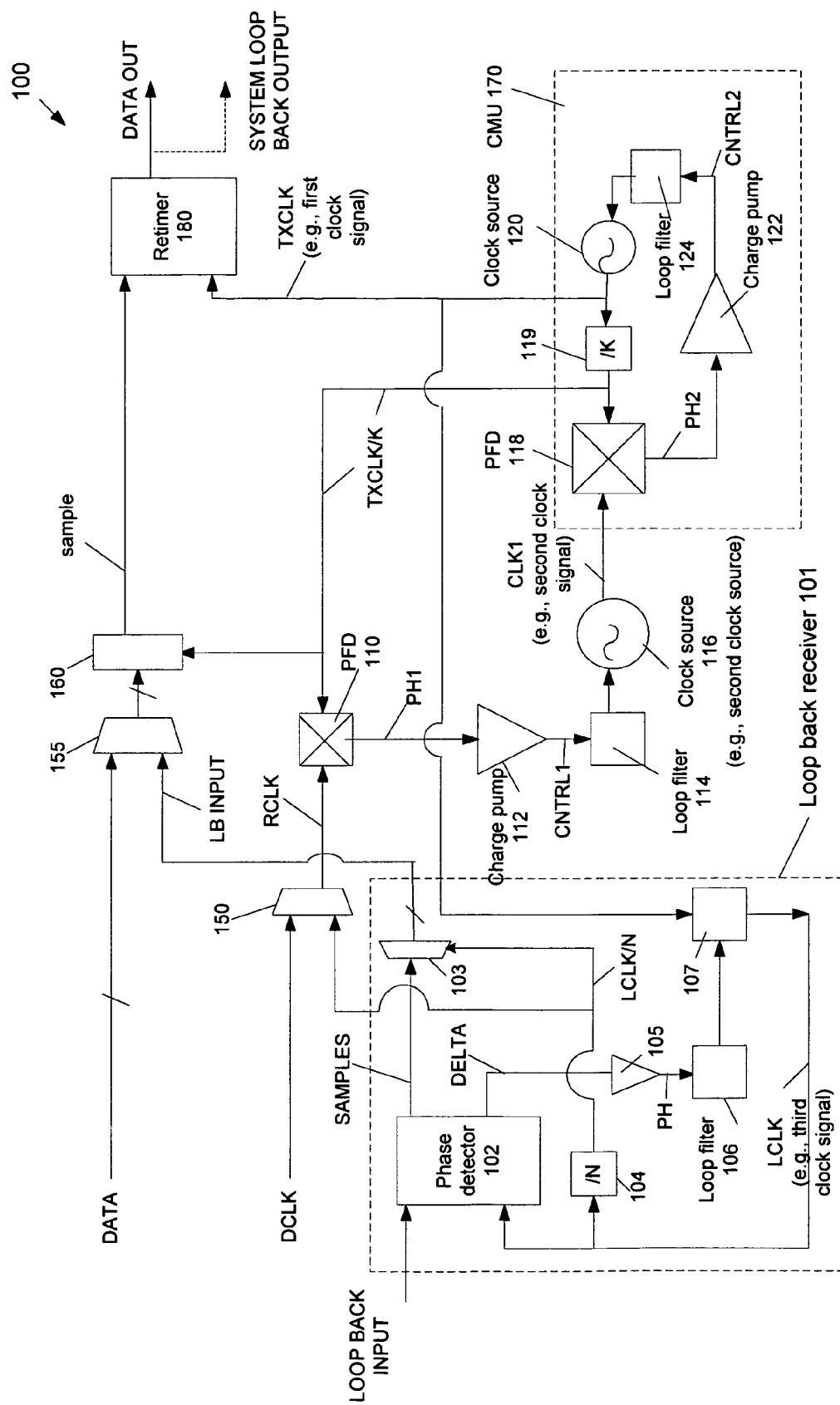
FIG. 2 depicts an implementation of a system that can be used for clock and data recovery, in accordance with an embodiment of the present invention.

FIG. 2 depicts an implementation of a transmitter system 100 that can perform clock and data recovery in accordance with an embodiment of the present invention. System 100 may clean up jitter in an input signal (such as signal DATA or signal LOOP BACK INPUT) and provide the jitter-cleaned signal for transmission. One implementation of system 100 may include multiplexer 150, multiplexer 155, serializer 160, loop back receiver 101, clock and multiplication unit ("CMU") 170, and retimer 180.

System 100 may operate in at least two modes: "loop back" and "transmit". Loop back mode may be used in connection with component testing and/or network path testing. Loop back mode may include "line" and "system" sub-modes. A line loop back mode configuration is described with respect to FIG. 1C. A system loop back mode configuration is described with respect to FIG. 1D.

In one implementation, components of system 100 may be implemented among the same integrated circuit. In another implementation, components of system 100 may be implemented among several integrated circuits that intercommunicate using, for example, a bus or conductive leads of a printed circuit board.

Loop back receiver 101 may include phase detector 102, demultiplexer 103, divider 104, charge pump 105, loop filter 106, and phase interpolator 107. Phase detector 102 may output samples of an input data signal (signal LOOP BACK INPUT) timed to clock LCLK. Signal LOOP BACK INPUT may be a version of a test signal previously provided for transmission by system 100. Phase detector 102 may output a phase difference signal (shown as DELTA) that represents whether a transition of the signal LOOP BACK INPUT leads or lags that of signal LCLK. Phase detector 102 may be implemented as an Alexander (bang-bang) type phase detector.

Charge pump 105 may output a signal PH having a magnitude in proportion to the magnitude of signal DELTA. Loop filter 106 may transfer portions of the signal PH whose frequency is within the pass band of the loop filter 106. The pass band of loop filter 106 may be set to transfer medium and high frequency jitter from signal LOOP BACK INPUT. In one embodiment, when a frequency of signal LOOP BACK INPUT is approximately 10 gigahertz, the pass band of loop filter 106 may have an upper frequency limit of approximately 8 megahertz.

Phase interpolator 107 may provide a clock signal LCLK having a similar frequency as that of signal TXCLK (from CMU 170) but potentially phase shifted based on signal DELTA. Phase interpolator 107 may provide signal LCLK to the phase detector 102 and frequency divider 104.

Frequency divider 104 may receive signal LCLK. Frequency divider 104 may provide signal LCLK/N, which may be a version of LCLK frequency divided by an integer N, to multiplexer 150 and demultiplexer 103. In one implementation, variable N may be 16, although other values may be used.

Demultiplexer 103 may receive a serial input stream of samples of signal LOOP BACK INPUT and convert the samples to parallel format according to the timing of clock signal LCLK/N. Demultiplexer 103 may provide a parallel sample stream as an input to multiplexer 155.

Multiplexer 150 may receive clock signal DCLK (from a device such as processor 12) and clock signal LCLK/N (from loop back receiver 101). In loop back mode, multiplexer 150 may transfer clock signal LCLK/N to PFD 110 whereas, in transmit mode, multiplexer 150 may transfer clock signal DCLK to PFD 110. The clock signal transferred by multiplexer 150 is referred to as RCLK.

PFD 110 may receive signals TXCLK/K and RCLK. PFD 110 may indicate a phase relationship between signals TXCLK/K and RCLK (e.g., lead or lag) (such phase relationship signal is shown as signal PH1). Charge pump 112 may output a signal (shown as CNTRL1) having a magnitude in proportion to the magnitude of signal PH1. Loop filter 114 may transfer portions of the signal CNTRL1 whose frequency is within the pass band of the loop filter 114. The bandwidth of loop filter 114 may be set to avoid high frequency jitter transfer from RCLK to CLK1. For example, in one embodiment, when a frequency of clock signal LCLK is approximately 10 gigahertz, the pass band of loop filter 114 may have an upper frequency limit of approximately 120 kilohertz.

Clock source 116 may receive the transferred portion of signal CNTRL1. Clock source 116 may output a clock signal CLK1. Signal CLK1 may have approximately the same frequency as that of signal TXCLK/K. Clock source 116 may adjust the phase of clock signal CLK1 based on the transferred portion of signal CNTRL1. For example, based on signal CNTRL1, clock source 116 may change the phase of clock signal CLK1 to approximately match that of signal RCLK. For example, clock source 116 may be implemented as a voltage controlled crystal oscillator (VCXO). Although a charge pump and loop filter combination is provided as an example herein, other devices may be used to selectively transfer a phase relationship represented by signal CNTRL1 to the clock source 116 when the frequency of CNTRL1 is within a pass band frequency range.

CMU 170 may provide clock signals TXCLK and TXCLK/K. CMU 170 may include phase and frequency detector ("PFD") 118, frequency divider 119, clock source 120, charge pump 122, and loop filter 124. Frequency divider 119 may receive clock signal TXCLK. Frequency divider 119 may provide signal TXCLK/K which may be a version of signal TXCLK frequency divided by an integer K. In one implementation, variable K may be 16, although other values may be used.

PFD 118 may receive signals CLK1 and TXCLK/K. PFD 118 may indicate a phase relationship between signals CLK1 and TXCLK/K (e.g., lead or lag) and provide the phase relationship to charge pump 122 (such phase relationship is shown as signal PH2). Based on signal PH2, charge pump 122 may output a signal to change the phase of clock signal TXCLK/K to match that of signal CLK1 (such phase change signal is labeled CNTRL2). Loop filter 124 may transfer signal CNTRL2 from charge pump 122 if the phase change signal is within the pass bandwidth of loop filter 124. The bandwidth of loop filter 124 may be large to ensure a very low jitter transfer from signal CLK1 to TXCLK and TXCLK/K.

Clock source 120 may provide a clock signal TXCLK. Clock source 120 may change the phase of signal TXCLK based on the phase change signal CNTRL2 selectively transferred by loop filter 124. For example, clock source 120 may be implemented as a voltage controlled oscillator (VCO).

Multiplexer 155 may receive signal LB INPUT from loop back receiver 101 and signal ATA from a source such as a processor 12 (not depicted). In loop back mode, multiplexer 155 may transfer signal LB INPUT to serializer 160 whereas in transmit mode, multiplexer 155 may transfer signal DATA to serializer 160. Serializer 160 may convert a format of signals from multiplexer 155 to serial format timed according to clock signal TXCLK/K. In transmit mode, jitter may be cleaned-up in signal DATA by use of clock signal RCLK to regenerate signal DATA.

Retimer device 180 may request and output samples from serializer 160 at a frequency determined by clock signal TXCLK. Retimer device 180 provide one output stream for transmission to a network (such output stream is shown as DATA OUT and can be used in line loop back mode) and may provide a copy to a local receiver in system loop back mode (such copy is shown as SYSTEM LOOP BACK OUTPUT).

Figure 3:
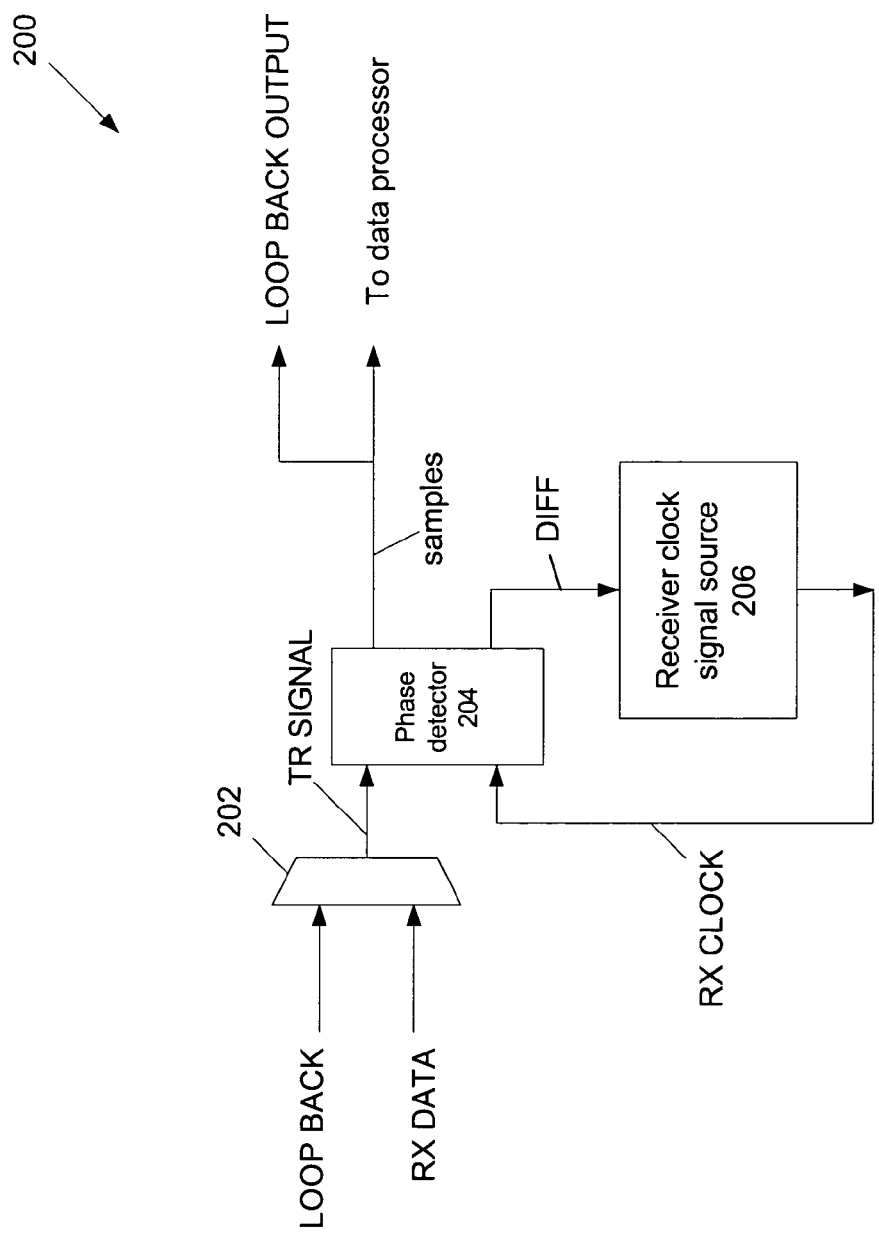
FIG. 3 depicts one possible implementation of a loop back receiver system, in accordance with an embodiment of the present invention.

FIG. 3 depicts one possible implementation of a loop back receiver system 200, in accordance with an embodiment of the present invention. Receiver system 200 may include a multiplexer 202, phase detector 204, and receiver clock signal source 206. Receiver system 200 may be used in a communications receiver device such as an optical signal transceiver. Receiver system 200 may operate in at least "loop back" and "receive" modes.

In one implementation, components of system 200 may be implemented among the same integrated circuit. In another implementation, components of system 200 may be implemented among several integrated circuits that intercommunicate using, for example, a bus or conductive leads of a printed circuit board.

Multiplexer 202 may receive a signal LOOP BACK as well as a signal RX DATA. Signal LOOP BACK may be a signal provided during line or system loop back modes. In "loop back" mode, the multiplexer 202 transfers signal LOOP BACK whereas in "receive" mode, the multiplexer 204 transfers signal RX DATA. Hereafter the signal transferred by multiplexer 202 is referred to as TR SIGNAL.

Phase detector 204 may provide samples of signal TR SIGNAL timed according to the clock signal RX CLOCK from clock signal source 206. The samples may be available for processing by a device downstream from system 200 such as a processor to perform component testing and/or network path testing. The samples may be made available as signal LOOP BACK OUTPUT for use in line loop back mode.

Phase detector 204 may output a phase difference signal (shown as DIFF) that represents whether a transition of the signal TR SIGNAL leads or lags that of clock signal RX CLOCK. Phase detector 204 may be implemented as an Alexander (bang-bang) type phase detector. Clock signal source 206 may provide clock signal RX CLOCK. Clock signal source 206 may adjust the phase of clock signal RX CLOCK based on signal DIFF. Clock signal source 206 may be configured in a phase-locked loop manner to transfer almost all jitter in the received signal.

Modifications

The drawings and the forgoing description gave examples of the present invention. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A system comprising:
a first transmitter to receive an input signal and to transmit a test signal based on the input signal to a network;
a first receiver to receive a return signal from the network;
a second receiver to receive the test signal from the network; and
a second transmitter to receive the test signal from the second receiver using a serial communications line, wherein the second transmitter is to reduce jitter in the test signal and provide the jitter reduced test signal as the return signal to the first receiver and wherein the second transmitter is to reduce jitter in the test signal based on clock signals provided by a plurality of clock sources and wherein the second transmitter comprises a de-multiplexer to de-serialize the test signal based on the plurality of clock signals.

2. The system of claim 1, further comprising a data processor to provide the input signal to the first transmitter and to receive the return signal from the first receiver, wherein the first receiver is to transfer the return signal with substantially no additional jitter correction to the data processor and wherein the data processor is to determine path integrity characteristics based on the input signal and return signal.

3. The system of claim 2, further comprising an interface to exchange signals with the data processor.

4. The system of claim 3, wherein the interface is compatible with XAUI.

5. The system of claim 3, wherein the interface is compatible with IEEE 1394.

6. The system of claim 3, wherein the interface is compatible with PCI.

7. The system of claim 3, further comprising a switch fabric coupled to the interface.

8. The system of claim 3, further comprising a packet processor coupled to the interface.

9. The system of claim 3, further comprising a memory device coupled to the interface.

10. The system of claim 2, wherein the data processor is to perform media access control in compliance with IEEE 802.3.

11. The system of claim 2, wherein the data processor is to perform optical transport network de-framing in compliance with ITU-T G.709.

12. The system of claim 2, wherein the data processor is to perform forward error correction processing in compliance with ITU-T G.975.

13. The system of claim 1, further comprising a data processor to provide the input signal to the first transmitter and wherein the first receiver is to receive the test signal from the first transmitter using a serial communications line and wherein the first receiver is to transfer the test signal with substantially no additional jitter correction to the data processor and wherein the data processor is to determine path integrity characteristics based on the test signal and the input signal.

14. The apparatus of claim 1, wherein the network comprises an optical network.

15. The apparatus of claim 1, wherein the network includes a copper network with capability to transmit and receive at least at a gigabit per second and in accordance with Ethernet.

16. The system of claim 1, wherein the first transmitter comprises:
a clock and multiplication unit to provide a first clock signal, wherein the first clock signal is based on a phase comparison between a second clock signal and a divided down version of the first clock signal;
a phase detector to selectively provide samples of the input signal based on a third clock signal, wherein the third clock signal is based on the first clock signal;
a de-multiplexer to convert the samples into parallel format based on a divided down version of the third clock signal; and
a second clock source to provide the second clock signal, wherein the second clock signal is based on a phase comparison between the divided down version of the first clock signal and the divided down version of the third clock signal.

17. The system of claim 16, wherein the first transmitter further comprises:
a serializer to convert the parallel format samples into serial format samples based on the divided down version of the first clock signal; and
a re-timer to provide the serial format samples from the serializer as the test signal based on the first clock signal.

18. The system of claim 1, wherein the first receiver further comprises:
logic to transfer the return signal with substantially no additional jitter correction.

19. The system of claim 1, wherein the second transmitter comprises:
a clock and multiplication unit to provide a first clock signal, wherein the first clock signal is based on a phase comparison between a second clock signal and a divided down version of the first clock signal;
a phase detector to selectively provide samples of the test signal based on a third clock signal, wherein the third clock signal is based on the first clock signal; and
a second clock source to provide the second clock signal, wherein the second clock signal is based on a phase comparison between the divided down version of the first clock signal and a divided down version of the third clock signal, wherein the de-multiplexer is to convert the samples into parallel format based on the divided down version of the third clock signal.

20. The system of claim 19, wherein the second transmitter comprises:
a serializer to convert the parallel format samples into serial format samples based on the divided down version of the first clock signal; and
a re-timer to provide the serial format samples from the serializer as the return signal based on the first clock signal.

21. The system of claim 1, wherein the second receiver is to transfer the test signal with substantially no additional jitter correction to the second transmitter.

22. A method comprising:
at a first transceiver:
receiving an input signal, and
transmitting a test signal to a network, wherein the test signal is based on the input signal;
at a second transceiver:
receiving the test signal from the network,
serially transferring the test signal with substantially no additional jitter correction as a first signal,
reducing jitter in the first signal, wherein the reducing jitter includes de-serializing the first signal based on a plurality of clock signals,
transmitting the jitter reduced first signal as a second signal to the network; and
at the first transceiver:
receiving the second signal from the network.

23. The method of claim 22, further comprising: at the first transceiver, determining path integrity characteristics based on the input signal and the second signal.

24. The method of claim 22, wherein at the first transceiver, transmitting the test signal to the network comprises:
reducing jitter in the input signal; and
providing the jitter reduced input signal as the test signal.

25. The method of claim 22, further comprising:
at the first transceiver:
determining path integrity characteristics based on a comparison between the input signal and the test signal.

* * * * *